United States Patent [19]
Abe et al.

[11] Patent Number: 6,023,590
[45] Date of Patent: Feb. 8, 2000

[54] IMAGE RECORDING DEVICE

[75] Inventors: Tetsuya Abe; Koichi Sato, both of Tokyo, Japan

[73] Assignee: Asahi Kogaku Kogyo Kabushiki Kaisha, Tokyo, Japan

[21] Appl. No.: 08/861,071

[22] Filed: May 21, 1997

[30] Foreign Application Priority Data

May 24, 1996 [JP] Japan ................................. 8-153170
Oct. 30, 1996 [JP] Japan ................................. 8-303834

[51] Int. Cl.[7] ............................................. G03B 19/00
[52] U.S. Cl. ............................................. 396/429; 396/315
[58] Field of Search .......................... 396/30, 429, 430, 396/315–318

[56] References Cited

U.S. PATENT DOCUMENTS

| | | | |
|---|---|---|---|
| 4,945,423 | 7/1990 | Takanashi et al. | 358/300 |
| 5,424,156 | 6/1995 | Aoki et al. | 430/59 |
| 5,629,920 | 5/1997 | Sakano et al. | 369/120 |
| 5,631,700 | 5/1997 | Sato | 348/222 |
| 5,646,927 | 7/1997 | Shimizu et al. | 369/99 |
| 5,842,050 | 11/1998 | Aoki | 396/30 |

FOREIGN PATENT DOCUMENTS

| | | |
|---|---|---|
| 52280 | 1/1993 | Japan . |
| 5165005 | 6/1993 | Japan . |
| 6130347 | 5/1994 | Japan . |
| 713132 | 1/1995 | Japan . |

Primary Examiner—Safet Metjahic
Assistant Examiner—John Chizmar
Attorney, Agent, or Firm—Greenblum & Bernstein, P.L.C.

[57] ABSTRACT

An image recording device mounted on an electro-developing type camera using an electro-developing recording medium in which an object image obtained through a photographing optical system is electronically developed. The electro-developing recording medium has a first recording area in which the image is recorded, and a second recording area in which information other than the image is recorded. First and second electrodes are provided in the first and second recording areas, respectively, so that an electric voltage can be independently applied to the first and second recording areas. By exposing the first recording area while applying the voltage thereto, the image is recorded in the first recording area. By heating the second recording area without applying the voltage thereto, the information is recorded in the second recording area.

13 Claims, 17 Drawing Sheets

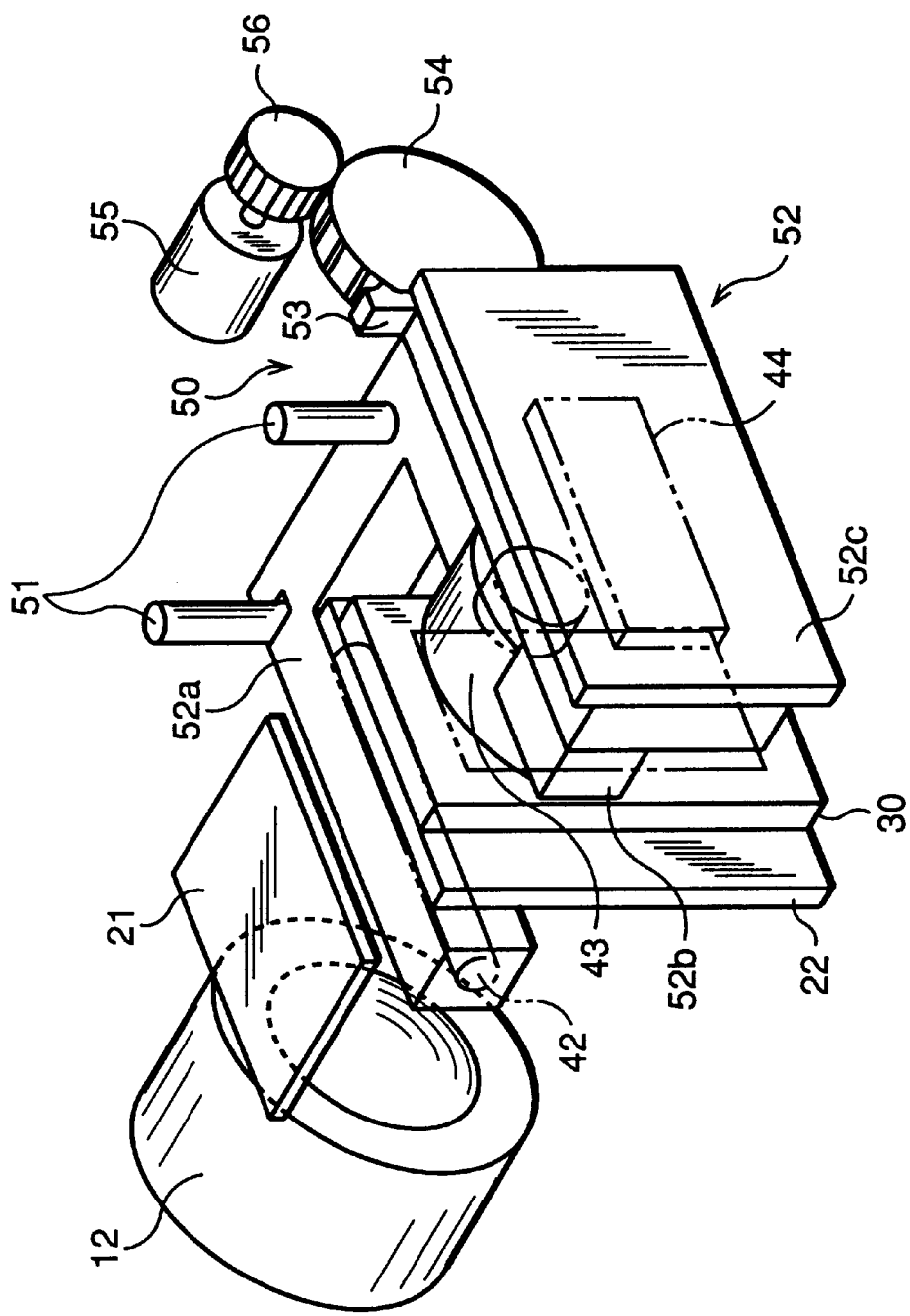

FIG. 11

|  | RECORDING MODE | READING MODE | ERASING MODE | |
|---|---|---|---|---|
|  |  |  | IMAGE ERS. | INFO. ERS. |
| SW 1 | ON | OFF | OFF | OFF |
| SW 2 | OFF | OFF | OFF | ON |
| TERML. A | Lo | Hi | Lo | Hi |
| TERML. B | Hi IN SOME TERMINALS | Lo IN ALL TERMINALS | Hi IN ALL TERMINALS | Lo IN ALL TERMINALS |

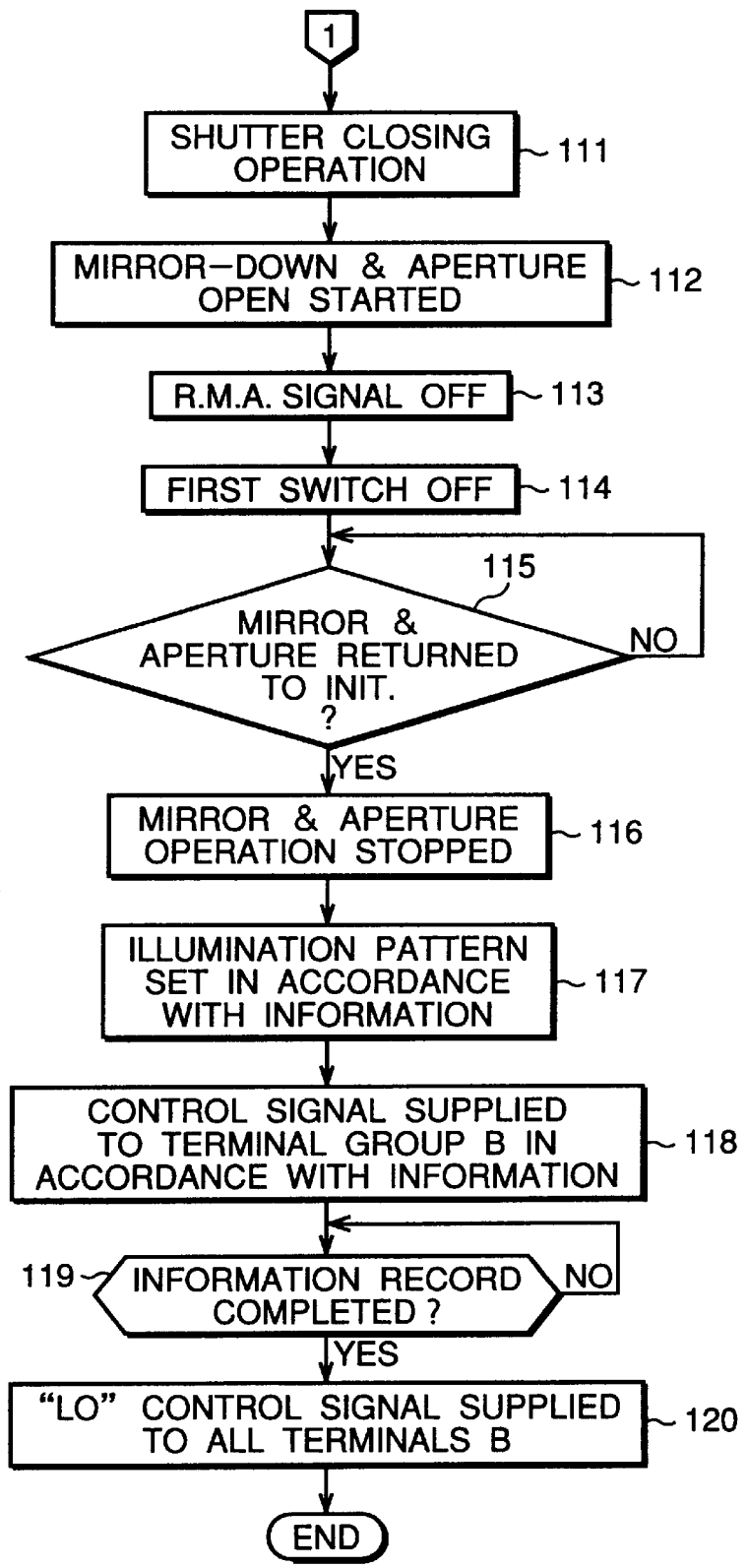

1

IMAGE RECORDING DEVICE

BACKGROUND OF THE INVENTION

1. Field of the Invention

The present invention relates to an image recording device using a recording medium in which an object image obtained through a photographing optical system is electronically developed.

2. Description of the Related Art

Conventionally, as disclosed in Japanese Unexamined Patent Publication No. 5-2280 and U.S. Pat. No. 5,424,156, there is known a photographic material which is directly electronically developed so that the developed visible image can be immediately obtained. In this specification, such a recording medium is referred to as an electro-developing recording medium, and an electronic still camera using the electro-developing recording medium is referred to as an electro-developing type camera.

In the conventional electro-developing recording medium, a date and a photographing condition such as an aperture, a shutter speed and so on cannot be recorded together with the image. Accordingly, when the image is reproduced, it is difficult to confirm the photographing condition immediately.

SUMMARY OF THE INVENTION

Therefore, an object of the present invention is to provide an image recording device which can record information such as a photographing condition, together with an image.

According to the present invention, there is provided an image recording device comprising an electro-developing recording medium by which an image formed thereon is electronically developed, a light source, and a controller.

The light source illuminates the electro-developing recording medium so that the image is read therefrom. The controller controls the intensity of light outputted by the light source so that the intensity has a value greater than a predetermined value to heat the electro-developing recording medium, whereby information other than the image is recorded thereon.

Further, according to the present invention, there is provided an image recording device comprising an electro-developing recording medium by which an image formed thereon is electronically developed, and a semiconductor laser light source.

The electro-developing recording medium has a first recording area in which an image is recorded, and a second recording area in which information other than the image is recorded. The semiconductor laser light source operates in one of an LED oscillating condition and a laser oscillating condition, the semiconductor laser light source outputting an illuminating light when operating in the LED oscillating condition and outputting a heat light when operating in the laser oscillating condition. The image recorded in the first recording area is read therefrom while the first recording area is illuminated by the illuminating light. The information is recorded in the second recording area while the second recording area is heated by the heat light.

BRIEF DESCRIPTION OF THE DRAWINGS

The objects and advantages of the present invention will be better understood from the following description, with reference to the accompanying drawings in which:

FIG. 6 is a perspective view showing a scanning mechanism;

FIG. 11 is a table showing the ON-OFF conditions of an electrode selecting switch and a control signal, supplied to a terminal A and a group of terminals B, in each of the operation modes;

FIGS. 13A and 13B are flow charts of a program for performing the recording operation;

DESCRIPTION OF THE PREFERRED EMBODIMENTS

Figure 1:
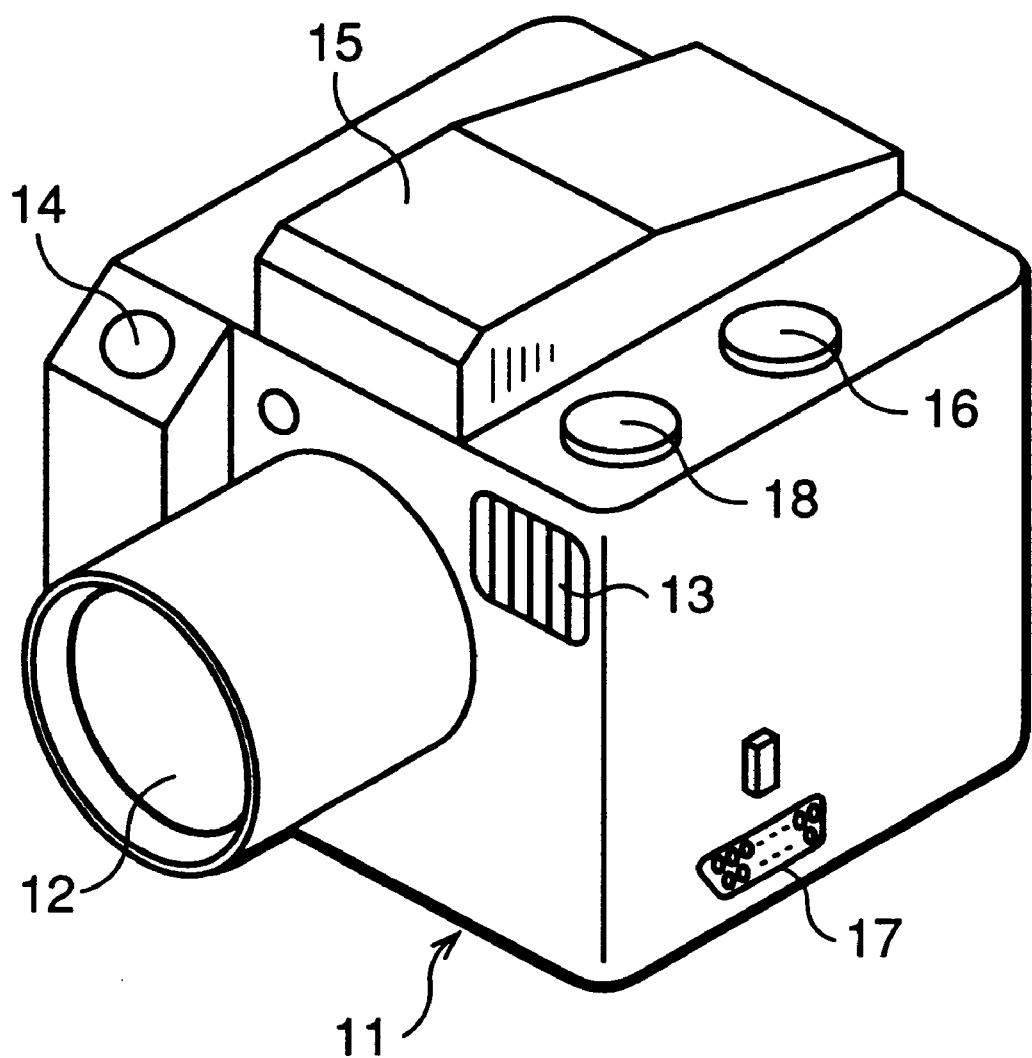
FIG. 1 is an external view showing an electro-developing type camera to which an embodiment of the present invention is applied.

FIG. 1 is an external view of an electro-developing type camera to which an embodiment according to the present invention is applied.

When viewing a camera body 11 from the front side, a photographing optical system 12 including a photographing lens system and so on is provided approximately at the center portion of the front surface of the camera body 11, and an electronic flash 13 is disposed thereon to the right of and above the photographing optical system 12. A release switch 14 is provided on the side opposite to the electronic flash 13.

On the upper surface of the camera body 11, a view finder 15 is provided at the center portion thereof and is extended from the front to the rear end of the camera body 11. A scan start switch 16 and an erase switch 18 are provided on the upper surface and beside the view finder 15. An output terminal 17 is provided on a lower portion of a side surface of the camera body 11, so that an image signal obtained by this camera can be output to an external recording device (not shown).

Figure 2:
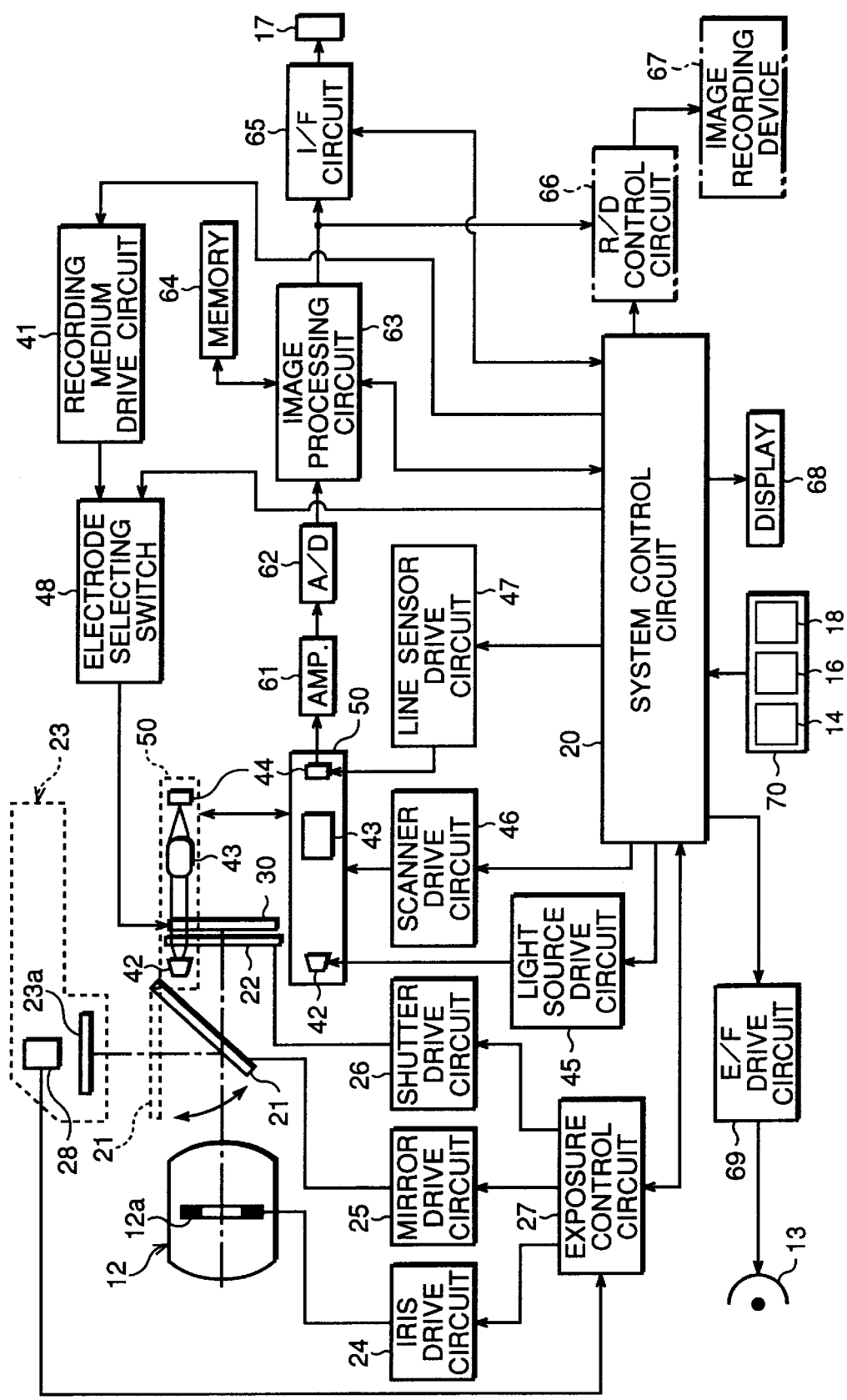
FIG. 2 is a block diagram of the electro-developing type camera shown in FIG. 1.

FIG. 2 is a block diagram of the electro-developing type camera, in which a system control circuit 20 including a microcomputer is mounted to control the electro-developing type camera as a whole.

The photographing optical system 12 has a plurality of lens groups and an aperture 12a. An electro-developing recording medium 30 is disposed behind the photographing optical system 12. A quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21. A photometry sensor 28 is provided in the view finder optical system 23 so that a photometry value is sensed.

The aperture 12a, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal output by the system control circuit 20. Namely, when an exposure is controlled, the degree of opening of the aperture 12a is adjusted by the iris drive circuit 24 under control of the exposure control circuit 27 based on an output signal of a photometry sensor 28.

The quick return mirror 21 is usually set to a down position (an inclined position shown by the solid line in the drawing), so that a light beam passing through the photographing optical system 12 is directed to the view-finder optical system 23 to form an object image on the focusing glass 23a, and thus an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed, but upon a photographing operation, the shutter 22 is opened for a predetermined period by the shutter drive circuit 26 under the control of the exposure control circuit 27, and thus, the light beam passing through the photographing optical system 12 strikes a light receiving surface of the electro-developing recording medium 30, thus forming a two-dimensional image thereon.

An electric voltage (i.e., a recording medium activating signal) is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. As described later, the electro-developing recording medium 30 has first and second recording areas, which are provided with first and second electrodes, respectively, so that an electric voltage is independently applied to each of the recording areas. An electrode selecting switch 48 is provided between the electro-developing recording medium 30 and the recording medium drive circuit 41 so that the voltage applications to the electrodes are controlled. The recording medium drive circuit 41 is operated in accordance with a command signal output by the system control circuit 20.

A scanning mechanism 50 is provided close to the electro-developing recording medium 30. A light source 42, a scanner optical system 43, and a line sensor 44 are supported by the scanning mechanism 50, and are moved along the electro-developing recording medium 30 by a scanning operation of the scanning mechanism 50.

The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The light source 42 is a semiconductor laser light source which can output a laser beam having a predetermined intensity. The light source 42 can be moved along the front surface of the shutter 22 or the front surface of the electro-developing recording medium 30, and the line sensor 44 can be moved along the rear surface of the electro-developing recording medium 30. The scanner optical system 43 is disposed between the light source 42 and the line sensor 44.

When a scanning is carried out by the scanning mechanism 50, the scanner optical system 43 is positioned between the electro-developing recording medium 30 and the line sensor 44, so that the image developed by the electro-developing recording medium 30 is illuminated by the light source 42 and formed on the light receiving surface of the line sensor 44, through an operation of the scanner optical system 43. Namely, the scanner optical system 43 is disposed on the optical path of the light beam which passes through the electro-developing recording medium 30, and the line sensor 44 is moved in an imaging plane, on which an image is formed by the scanner optical system 43.

ON and OFF control and the laser beam intensity control of the light source 42 are performed by a light source drive circuit 45. Control of the reading operation of pixel signals generated in the line sensor 44 is carried out by a line sensor drive circuit 47. Control of the movement of the scanning mechanism 50 is performed by a scanner drive circuit 46. The circuits 45, 46, and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction, and so on by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputted from the line sensor 44, or may have a storage capacity of one frame's worth of pixel signals.

The pixel signals read from the memory 64 are input to an interface circuit 65 through the image processing circuit 63, so that the pixel signals are subjected to a predetermined process, such as a format conversion, and can then be output to an external computer (not shown) through the output terminal 17. The pixel signals output from the image processing circuit 63 are subjected to a predetermined process, such as an image compression and a format conversion, in a recording device control circuit 66, so that the pixel signals can be recorded on a recording medium, such as an IC memory card, for example, in an image recording device 67. The interface circuit 65 and the recording device control circuit 66 are operated in accordance with a command signal output from the system control circuit 20.

An operation unit 70 including the release switch 14, the scan start switch 16, and the erase switch 18 are connected to the system control circuit 20. A photography operation (i.e., a recording operation) and a reading operation are performed by operating the release switch 14 and the scan start switch 16, respectively. An erase operation is performed by operating the erase switch 18. A display device 68 is connected to the system control circuit 20 to indicate various setting conditions of the electro-developing type camera. Further, an electric flash drive circuit 69 is connected to the system control circuit 20 to control the flash operation of the electronic flash 13.

Figure 3:
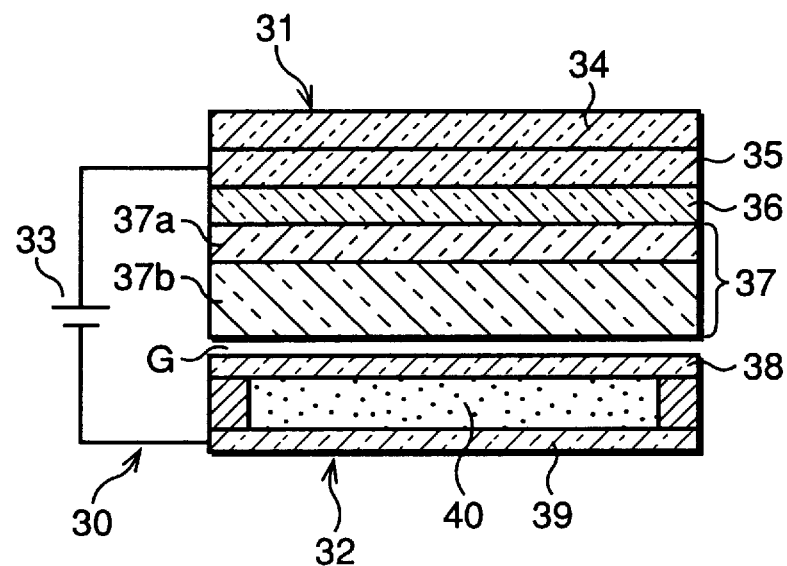
FIG. 3 is a sectional view showing a first example of a structure of an electro-developing recording medium.

FIG. 3 shows a structure of the electro-developing recording medium 30, which is basically the same as that shown in Japanese Unexamined Patent Publication No. 5-2280.

The electro-developing recording medium 30 has an electrostatic information recording medium 31 and an electric charge storage medium 32. An electric voltage is applied thereto by an electric power source 33. The electric power source 33 corresponds to the recording medium drive circuit 41, so that ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap G therebetween.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is displayed on the liquid crystal display 40 as a visible image, and thus, an object image is developed. Namely, the visible image is generated in accordance with the electric charge.

The electric charge storage medium 32 is a liquid crystal display (i.e., LCD) having a memory-type liquid crystal such as a smectic liquid crystal, and thus, the developed visible image is held therein even if the electric field is removed. The developed visible image of the LCD can be erased by heating it, using a laser beam at a predetermined temperature. In such a case, the same electric charge storage medium 32 can be used repeatedly.

Figure 4:
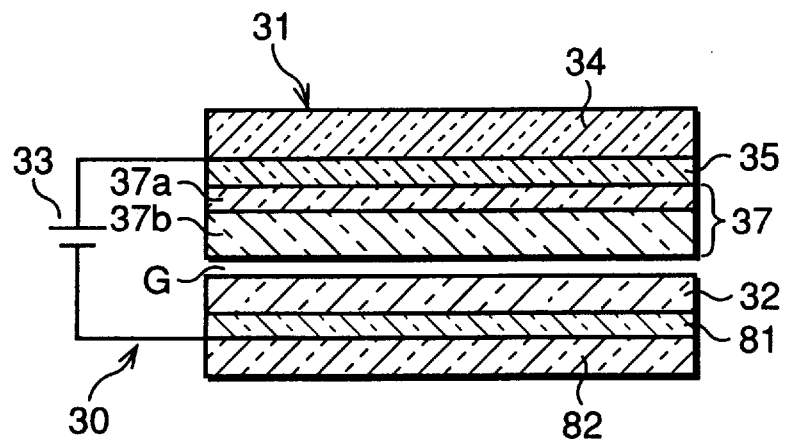
FIG. 4 is a sectional view showing a second example of a structure of the electro-developing recording medium.

FIG. 4 shows a second example of a structure of the electro-developing recording medium 30, and is similar to that shown in Japanese Unexamined Patent Publication No. 5-165005, except that the recording areas are divided.

The electrostatic information recording medium 31 is formed by laminating the base plate 34, the electrode layer 35 and the photoconducting layer 37. The photoconducting layer 37 is formed by laminating the electric charge generating layer 37a and the electric charge transferring layer 37b. The electric charge storage medium 32 is a liquid crystal display having a memory-type liquid crystal such as a smectic liquid crystal, and faces the photoconducting layer 37 with a small gap G therebetween. An electrode layer 81 and a base plate 82 are laminated on a surface of the electric charge storage medium 32, whose surface is opposite to the electrostatic information recording medium 31. The other structures are the same as those shown in FIG. 3.

Figure 5:
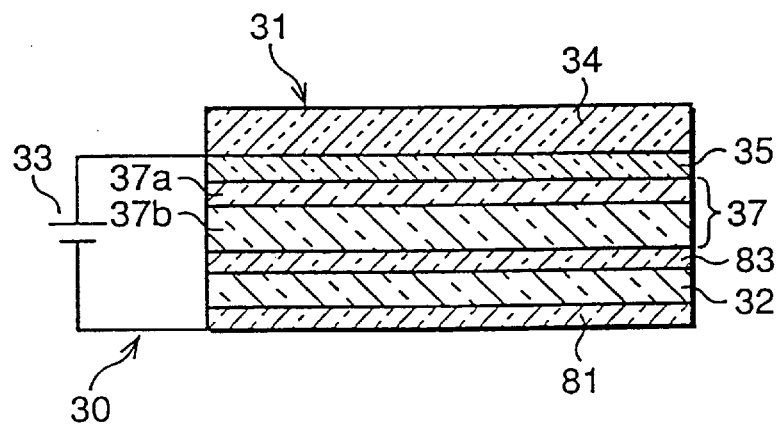
FIG. 5 is a sectional view showing a third example of a structure of the electro-developing recording medium.

FIG. 5 shows a third example of a structure of the electro-developing recording medium 30, and is similar to that shown in Japanese Unexamined Patent Publication Nos. 6-130347 and 7-13132, except that the recording areas are divided.

This electro-developing recording medium 30 is of a unibody type. In the electro-developing recording medium 30, an insulating layer 83 is provided between the electric charge transferring layer 37b of the electrostatic information recording medium 31 and the electric charge storage medium 32 which is a liquid crystal display having a memory-type liquid crystal such as a smectic liquid crystal, and an electrode layer 81 is laminated on a surface of the electric charge storage medium 32 whose surface is opposite to the electrostatic information recording medium 31. The other structures are the same as those shown in FIG. 4. Namely, no gap is formed between the electrostatic information recording medium 31 and the electric charge storage medium 32.

The electro-developing recording mediums 30 shown in FIGS. 3 through 5 can be used in the electro-developing type camera having an electric circuit shown in FIG. 1. The following description assumes that the electro-developing type camera is provided with the electro-developing recording medium 30 shown in FIG. 3.

FIG. 6 shows the structure of the scanning mechanism 50, and the members provided around the scanning mechanism 50.

The scanning mechanism 50 has a moving member 52 which is slidably supported by a pair of guide shafts 51 and has first and second leg portions 52a and 52b and a support portion 52c. The first leg portion 52a is extended between the quick return mirror 21 and the shutter 22, and the second leg portion 52b is extended behind the electro-developing recording medium 30. The support portion 52c is provided behind the second leg portion 52b. The light source 42, the scanner optical system 43, and the line sensor 44 are attached to the first leg portion 52a, the second leg portion 52b, and the support portion 52c, respectively. The light source 42 and the line sensor 44 are both extended in a horizontal direction. A rack 53 fixed to the moving member 52 is meshed with a pinion 54, which is meshed with a smaller gear 56 attached to an output shaft of a scan drive motor 55.

When a reading of an image from the electro-developing recording medium 30 is not performed, the moving member 52 is in a position offset from a path between the photographing optical system 12 and the electro-developing recording medium 30; this position being below the electro-developing recording medium 30, for example. As described later, when an image recorded on the electro-developing recording medium 30 is read, the scan drive motor 55 is rotated, and thus the moving member 52 is moved upward so that a scan by the line sensor 44 is carried out, and the line sensor 44 is moved in a direction perpendicular to the longitudinal direction of the line sensor 44. Similarly, when the image recorded on the electro-developing recording medium 30 is erased, the moving member 52 is moved upward by the operation of the scan drive motor 55, and thus, the light source 42 is moved in a direction perpendicular to the width of the electro-developing recording medium 30.

Figure 7:
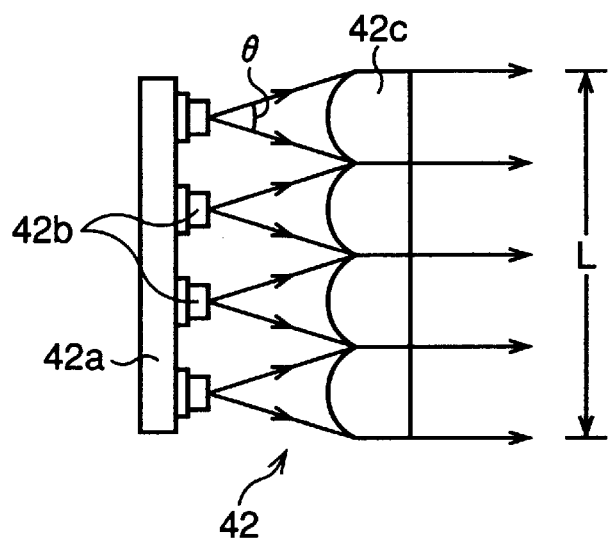
FIG. 7 is a plan view showing a light source.

FIG. 7 is a plan view showing the light source 42. A plurality of semiconductor laser diodes 42b are aligned on a support frame 42a. Although there are four laser diodes 42b in FIG. 7, there can be more than four in accordance with the amount of information to be recorded in the second recording area. Namely, when the number of the laser diodes 42b is "n", "n" bits of digital information can be recorded in the second recording area. In this embodiment, some high-order digits are allocated for indicating the aperture value, and the remaining low-order digits are allocated for indicating the shutter speed.

A collimating lens 42c is provided in front of the laser diodes 42b. Although the spread angle θ of the laser beam outputted by the laser diodes 42b is 30° through 40°, for example, the laser beam is converted to a parallel beam by the collimating lens 42c, and is radiated onto the light receiving surface of the electro-developing recording medium 30. The laser beam outputted by the light source 42 has a linear shape, the length (L) of which is more than or equal to the width of the electro-developing recording medium 30, the width corresponding to the longitudinal direction of the first leg portion 52a (see FIG. 6).

Figure 8:
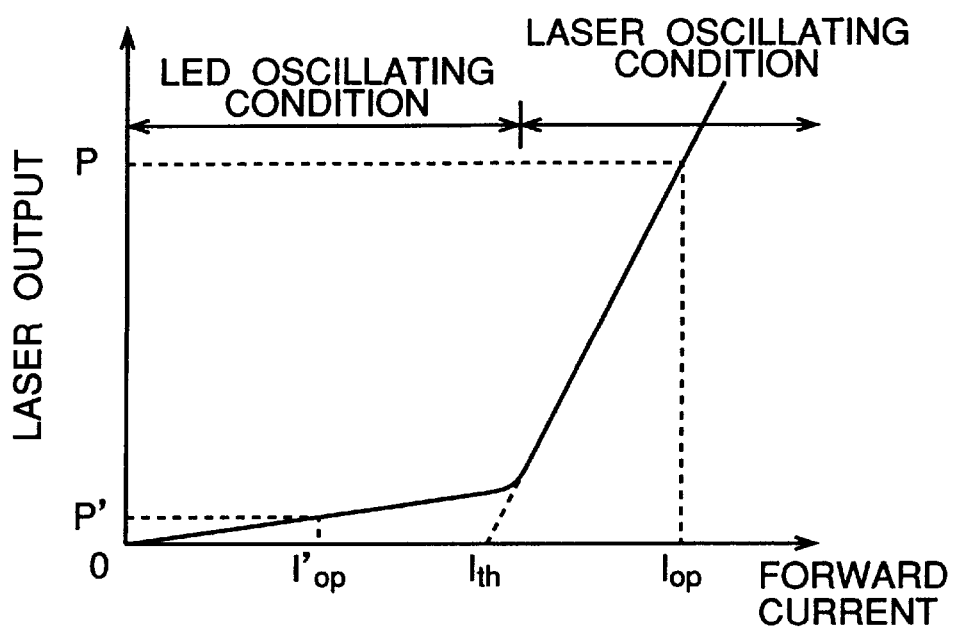
FIG. 8 is a graph showing the relationship between forward current flowing in the laser diodes and the intensity of light output by the laser diodes.

FIG. 8 shows the relationship between forward current flowing in the laser diodes 42b and the intensity of light output by the laser diodes 42b.

When the value of the forward current is $I'_{op}$, i.e. less than a first threshold value ($I_{th}$), the intensity of light (P') is relatively low, hence the laser diodes 42b operate in an LED oscillating condition to output an illuminating light. When the value of the forward current is slightly higher than the first threshold value ($I_{th}$), the laser diodes 42b operate in a laser oscillating condition. However, the intensity of light being low, the laser diodes 42b output an illuminating light.

When the value of the forward current significantly exceeds the first threshold value ($I_{th}$), the intensity of light drastically increases. Then, when the value of the forward current exceeds a second threshold value (not shown) to become $I_{op}$, for example, the liquid crystal display 40 of the electro-developing recording medium 30 is heated by the output light of the laser diode 42b, so that the liquid crystal molecules are initialized to become a regular parallel arrangement which is the same state as the non-recorded condition. Namely, by the output light of the laser diode 42b, the portion of the electro-developing recording medium 30, which is heated, is changed to the state (i.e., a low transmittance state) in which the electro-developing recording medium 30 is not exposed, and thus, the image recorded in the first recording area is erased. Further, by setting the second recording area to a transparent condition beforehand, a mark or a letter can then be recorded in the second recording area.

Note that, in the following description, the output light of the laser diode 42b, which is output when the drive current flowing in the laser diode 42b is $I'_{op}$, for example, to illuminate the liquid crystal display 40, is referred to as "illumination light", and the output light of the laser diode 42b, which is output when the drive current is higher than $I_{op}$ to heat the liquid crystal display 40, is referred to as "heat light".

Figure 9:
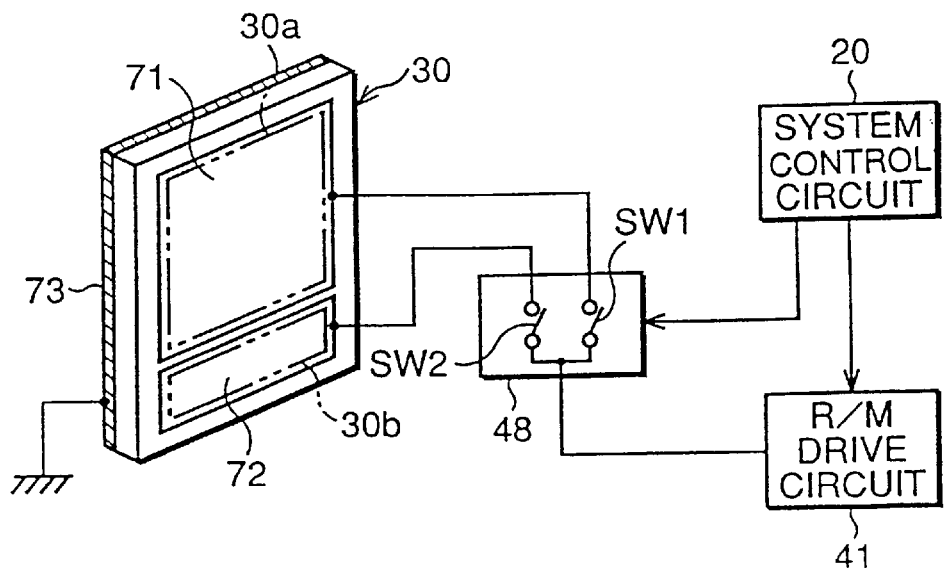
FIG. 9 is a diagram of a construction for applying an electric voltage to the electro-developing recording medium.

FIG. 9 shows a construction for applying an electric voltage to the electro-developing recording medium 30.

The electro-developing recording medium 30 has a first recording area 30a, in which an image is recorded, and a second recording area 30b, in which information other than the image is recorded. On the light receiving surface of the electro-developing recording medium 30, a first control electrode 71 is provided on a portion corresponding to the first recording area 30a, and a second control electrode 72 is provided on the other portion corresponding to the second recording area 30b. On the entire rear surface of the electro-developing recording medium 30, a common electrode 73 is provided and grounded.

The first and second electrodes 71 and 72 are connected to the recording medium drive circuit 41 through first and second switches SW1 and SW2 provided in the electrode selecting switch 48. These switches SW1 and SW2 are controlled by the system control circuit 20 to open or close selectively. When the first switch SW1 is closed, an electric voltage is applied to the first electrode 71, i.e., the first recording area 30a. When the second switch SW2 is closed, an electric voltage is applied to the second electrode 72, i.e., the second recording area 30b.

Figure 10:
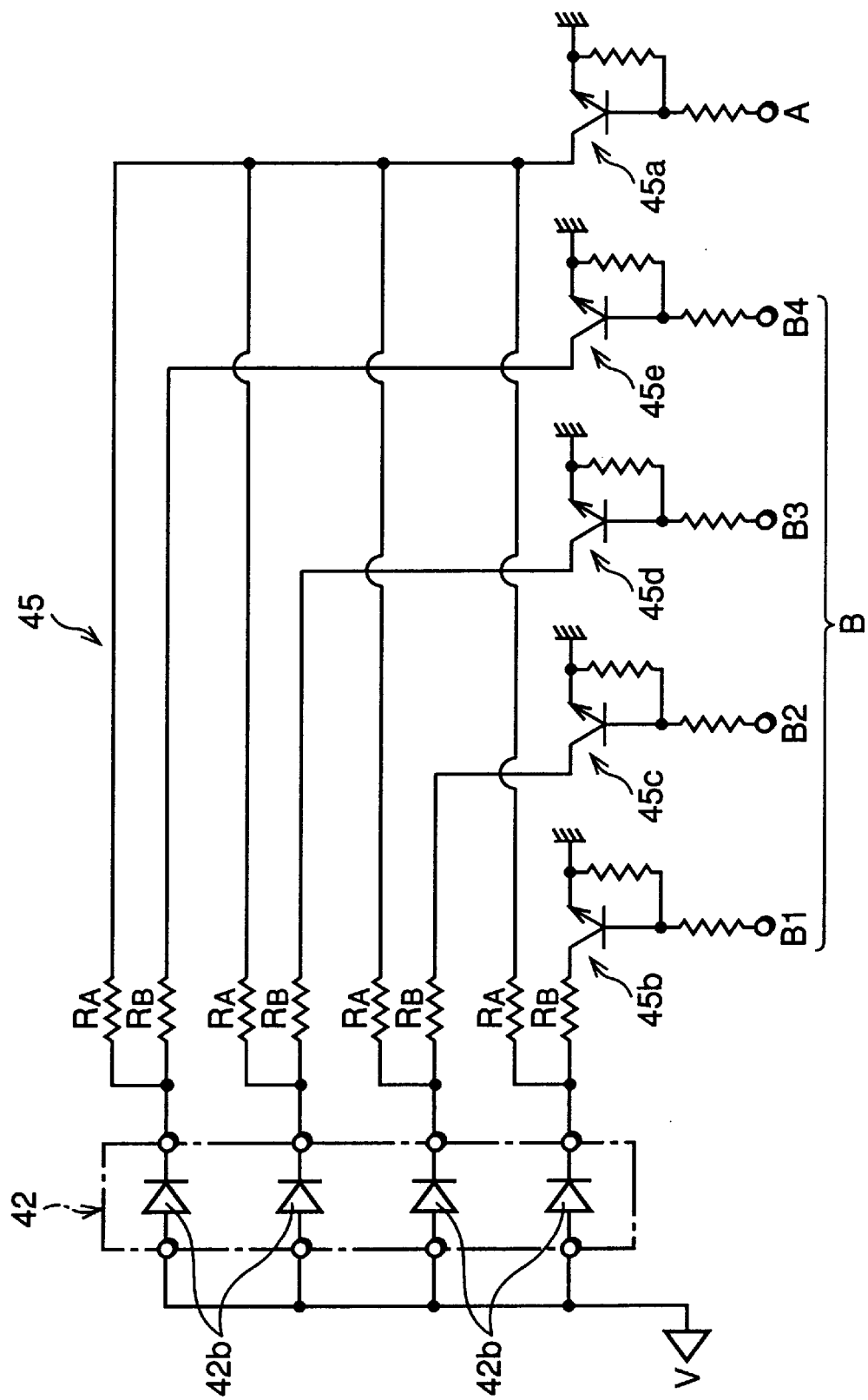
FIG. 10 is a diagram showing a circuit of a light source drive circuit.

FIG. 10 shows an example of the light source drive circuit 45. The forward voltage terminal of each of the laser diodes 42b is connected to a power supply V, and the backward voltage terminal of each of the laser diodes 42b is connected to first and second resistances RA and RB. The first resistances RA are connected to a collector of a transistor 45a connected to a first terminal A. The second resistances RB are connected to collectors of transistors 45b, 45c, 45d, and 45e connected to second terminals B1, B2, B3, and B4, respectively, which form a group of terminals B. The emitters of the transistors 45a, 45b, 45c, 45d, and 45e are grounded, and voltages corresponding to control signals outputted by the system control circuit 20 are applied to the bases of the transistors 45a through 45e.

The value of the first resistance RA is larger than that of the second resistance RB. The value of the first resistance RA is $$RA=(V-VF)/I'_{op}$$

for example, and the value of the second resistance RB is $$RB=(V-VF)/I_{op}$$

wherein VF is a forward voltage drop of the laser diode 42b.

FIG. 11 shows the ON-OFF conditions of the electrode selecting switch 48 and a control signal supplied to the terminal A and the group of terminals B, in each of the operation modes of the electro-developing type camera.

In a record mode, an image is recorded in the first recording area 30a, and information other than the image (i.e., an aperture value, a shutter speed, and a date, for example) are recorded in the second recording area 30b. When this record mode is set, as the initial condition of the electro-developing recording medium 30, the first recording area 30a is in a non-transparent condition (low transmittance state) as a whole, and the second recording area 30b is in a transparent condition (high transmittance state) as a whole.

In the electrode selecting switch 48, the first switch SW1 is turned ON and the second switch SW2 is turned OFF. Therefore, an electric voltage is applied to the first recording area 30a, and no electric voltage is applied to the second recording area 30b. In the light source drive circuit 45, a control signal of a low level (Lo) is supplied to the terminal A, so that the transistor 45a is set to an OFF condition. Conversely, a control signal of a high level (Hi) is supplied to predetermined terminals included in the second terminals B1 through B4, depending upon information received (an aperture value, a shutter speed, and a date, for example), so that only the corresponding transistors 45b through 45e connected to the predetermined terminal, which has a control signal of a high level, is set to an ON condition. Namely, a heat light is emitted from each of the activated laser diodes 42b.

Accordingly, the first recording area 30a is exposed, so that an object image formed thereon is electronically developed. In the second recording area 30b, predetermined portions are heated by the laser diodes 42b which correspond to the terminals B1 through B4 to which the Hi control signals are supplied, so that information such as an aperture value is recorded.

In a reading mode, an image recorded in the first recording area 30a and the information recorded in the second recording area 30b are read therefrom.

In the electrode selecting switch 48, the first and second switches SW1 and SW2 are turned OFF. Therefore, no electric voltage is applied to the first and second recording areas 30a and 30b. In the light source drive circuit 45, a control signal of a high level (Hi) is supplied to the terminal A, so that the transistor 45a is set to an ON condition. A control signal of a low level (Lo) is supplied to each of the second terminals B1 through B4, so that each of the transistors 45b through 45e is set to an OFF condition. Namely, an illumination light is radiated from all of the laser diodes 42b.

Accordingly, while the scanning mechanism 50 is driven, the image and the information recorded in the first and second recording areas 30a and 30b are illuminated by the light source 42, so that the image and the information are read by the line sensor 44.

In an image erasing operation of an erasing mode, the image recorded in the first recording area 30a is erased.

In the electrode selecting switch 48, the first and second switches SW1 and SW2 are turned OFF. Therefore, no electric voltage is applied to the first and second recording areas 30a and 30b. In the light source drive circuit 45, a control signal of a low level (Lo) is supplied to the terminal A, so that the transistor 45a is set to an OFF condition. A control signal of a high level (Hi) is supplied to each of the second terminals B1 through B4, so that each of the transistors 45b through 45e is set to an ON condition. Namely, a heat light is radiated from all of the laser diodes 42b.

Accordingly, while the scanning mechanism 50 is driven, the first recording area 30a is heated as a whole, so that the image recorded therein is erased.

In an information erasing operation of an erasing mode, the information recorded in the second recording area 30b is erased.

In the electrode selecting switch 48, the first switch SW1 is turned OFF, and the second switch SW2 is turned ON. Therefore, an electric voltage is applied to the second recording area 30b, and no electric voltage is applied to the first recording area 30a. In the light source drive circuit 45, a control signal of a high level (Hi) is supplied to the terminal A, so that the transistor 45a is set to an ON condition. A control signal of a low level (Lo) is supplied to each of the second terminals B1 through B4, so that each of the transistors 45b through 45e is set to an OFF condition. Namely, an illumination light is radiated from all of the laser diodes 42b.

Accordingly, the second recording area 30b is exposed to the illumination light, so that the second recording area 30b becomes transparent, and thus the information is erased.

Figure 12:
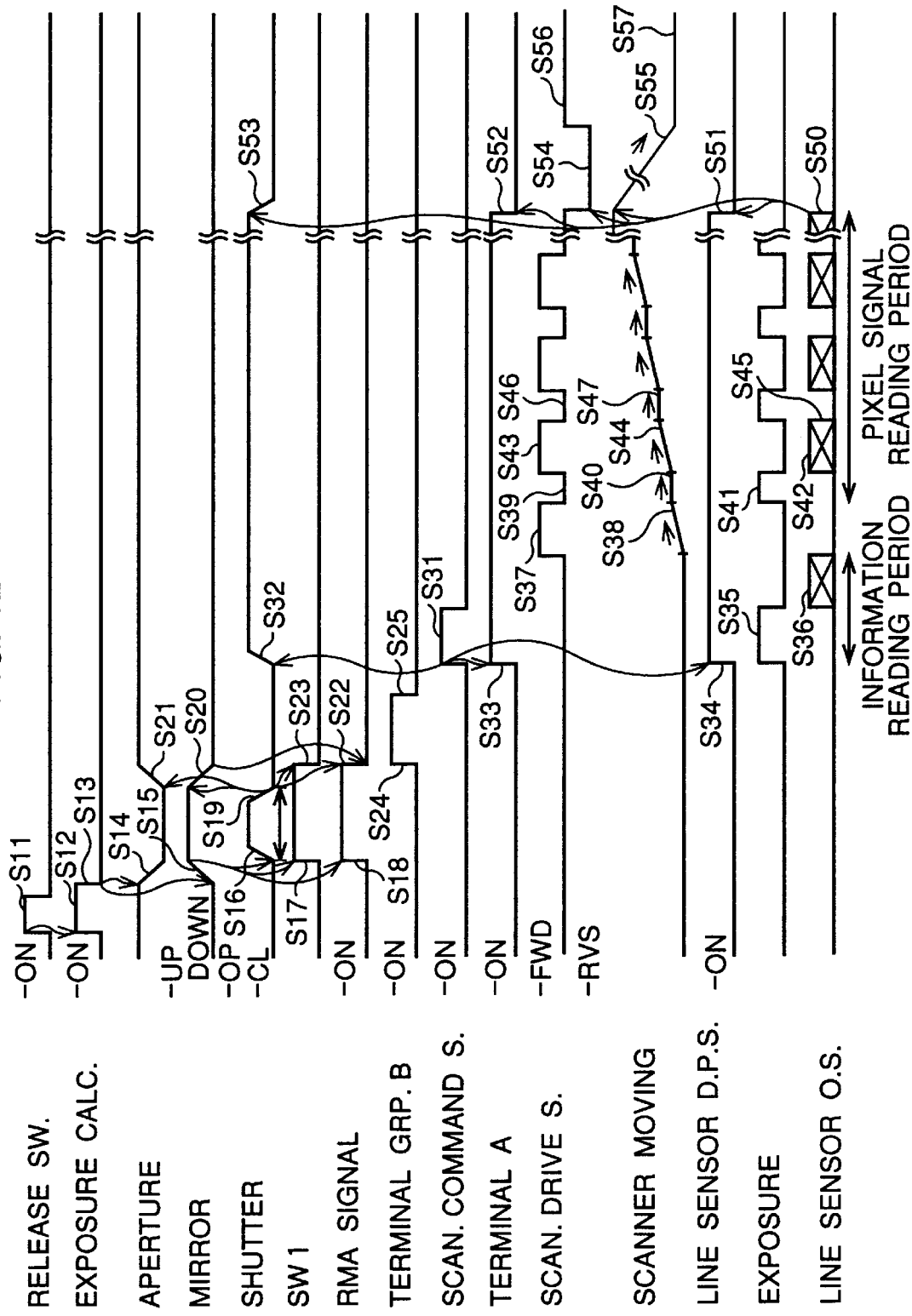
FIG. 12 is a timing chart showing a recording operation and a reading operation.
Figure 13A:
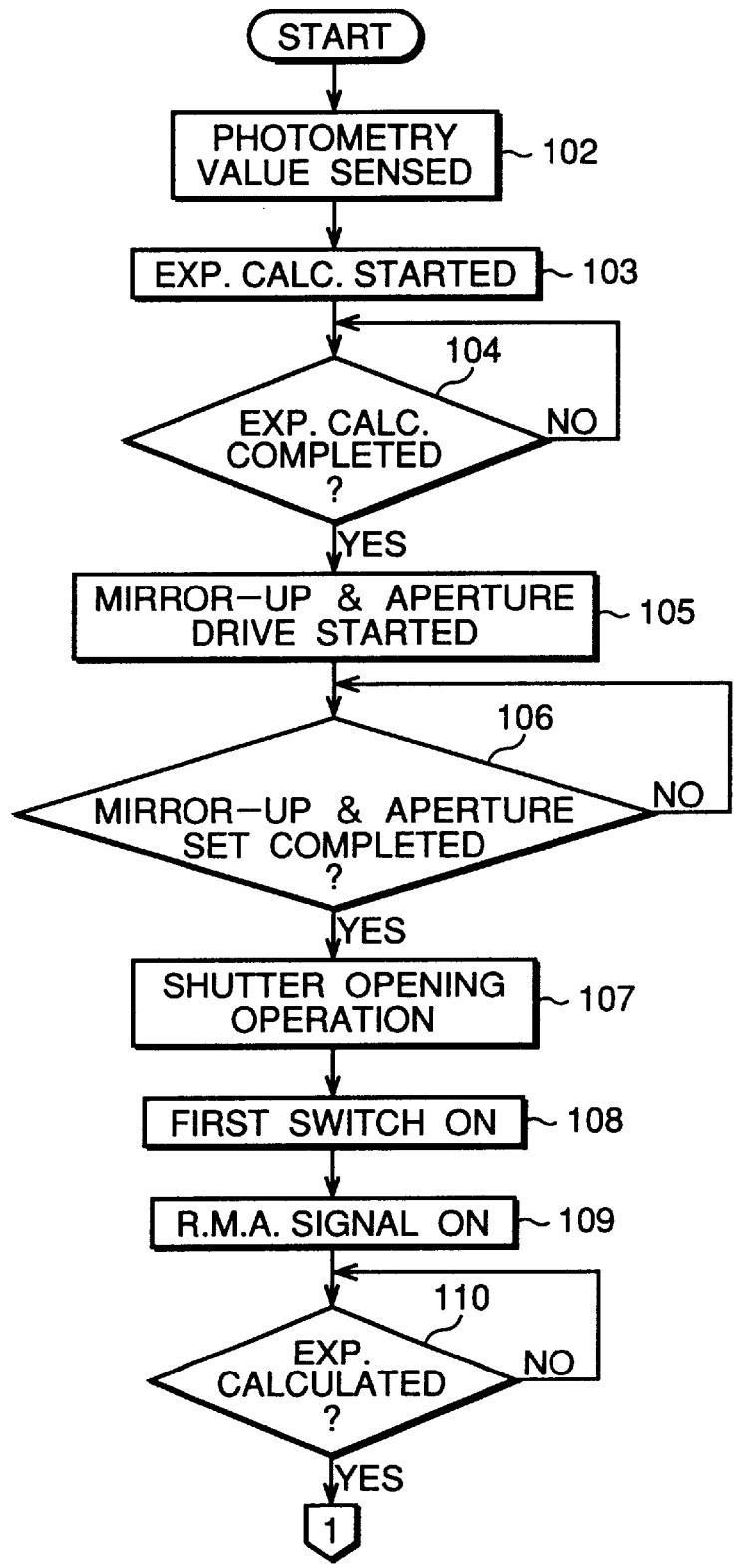
Figure 14A:
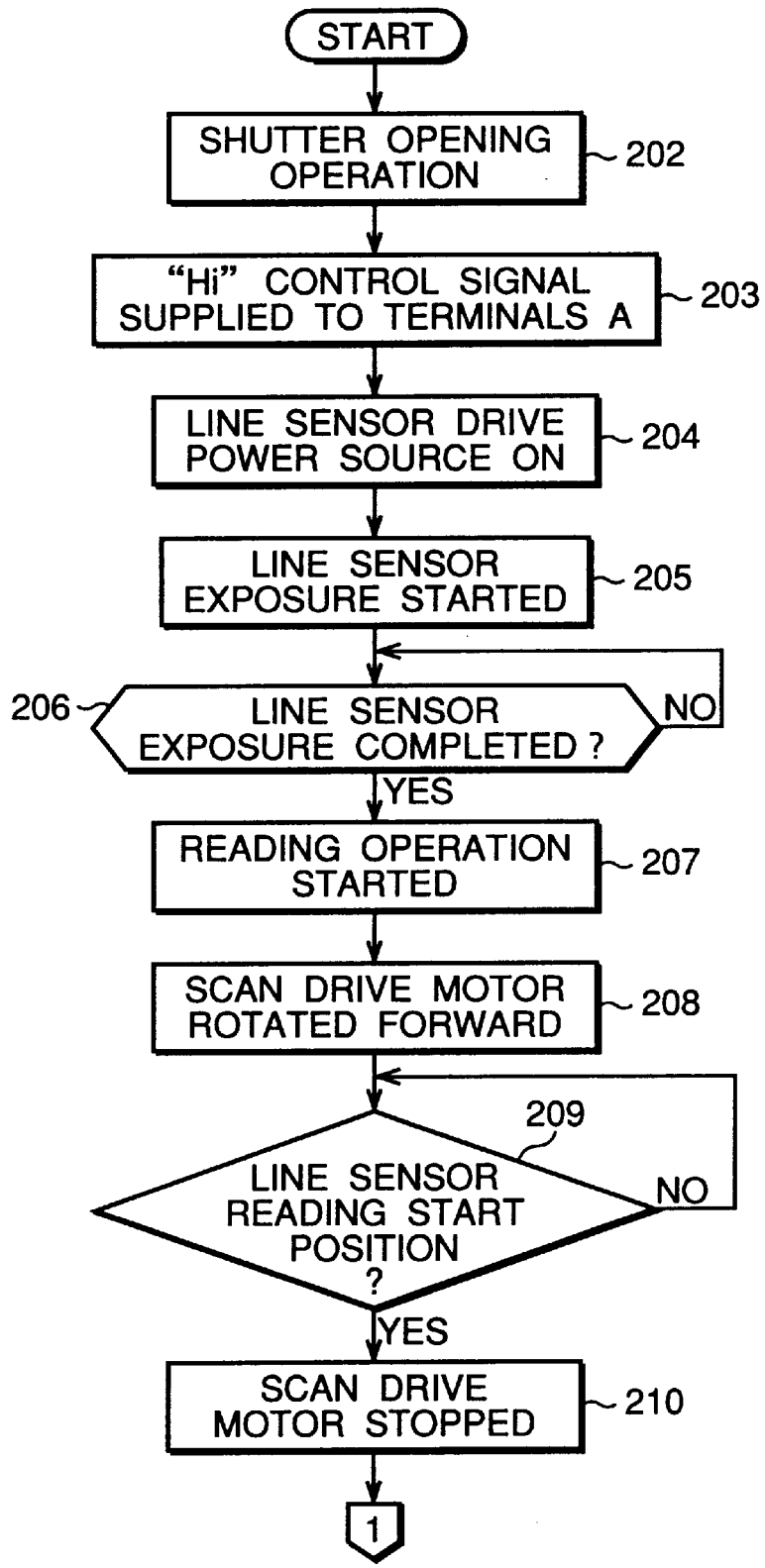
FIGS. 14A, 14B, and 14C are flow charts of a program for performing the reading operation.
Figure 14B:
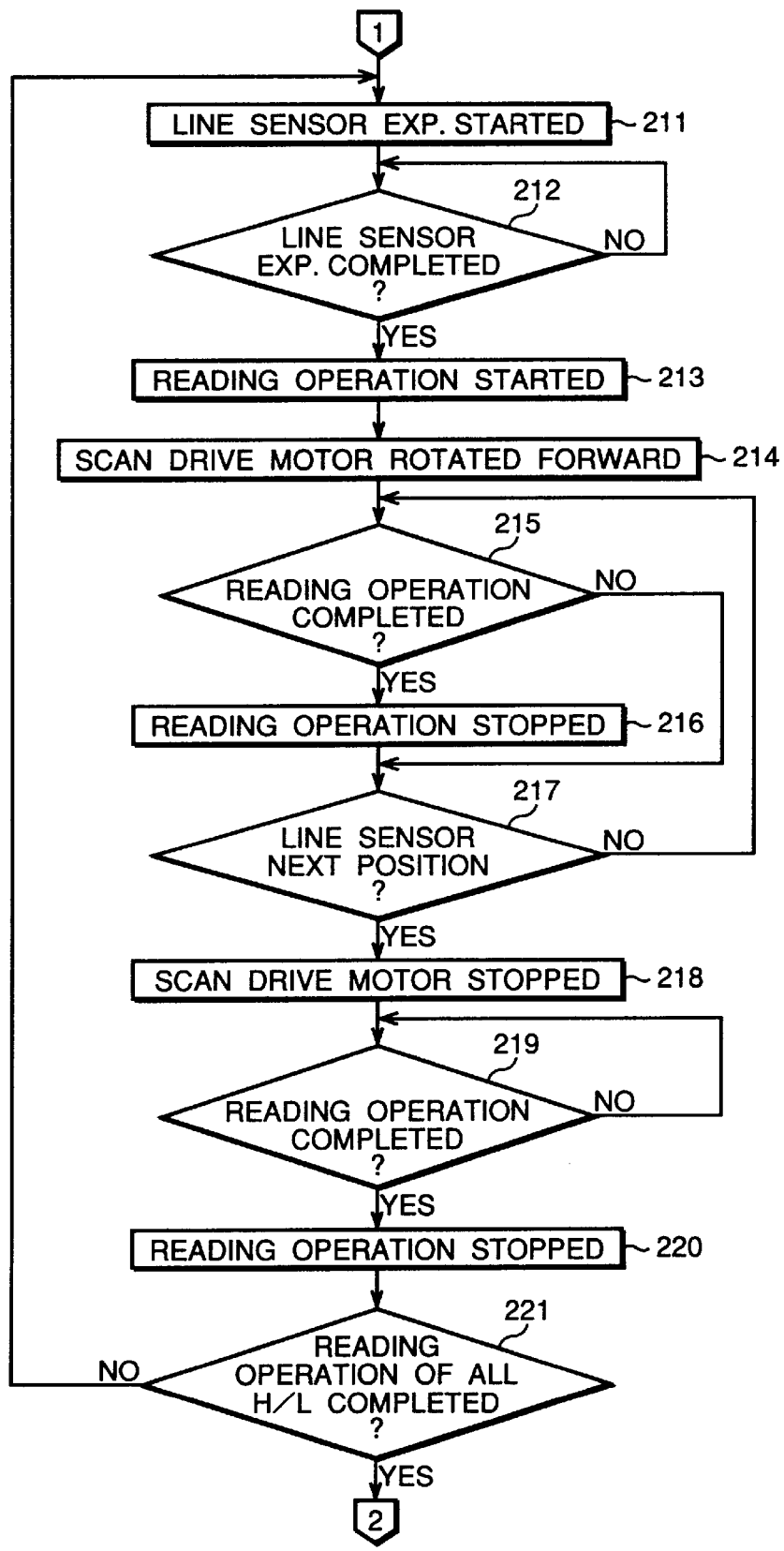
Figure 14C:
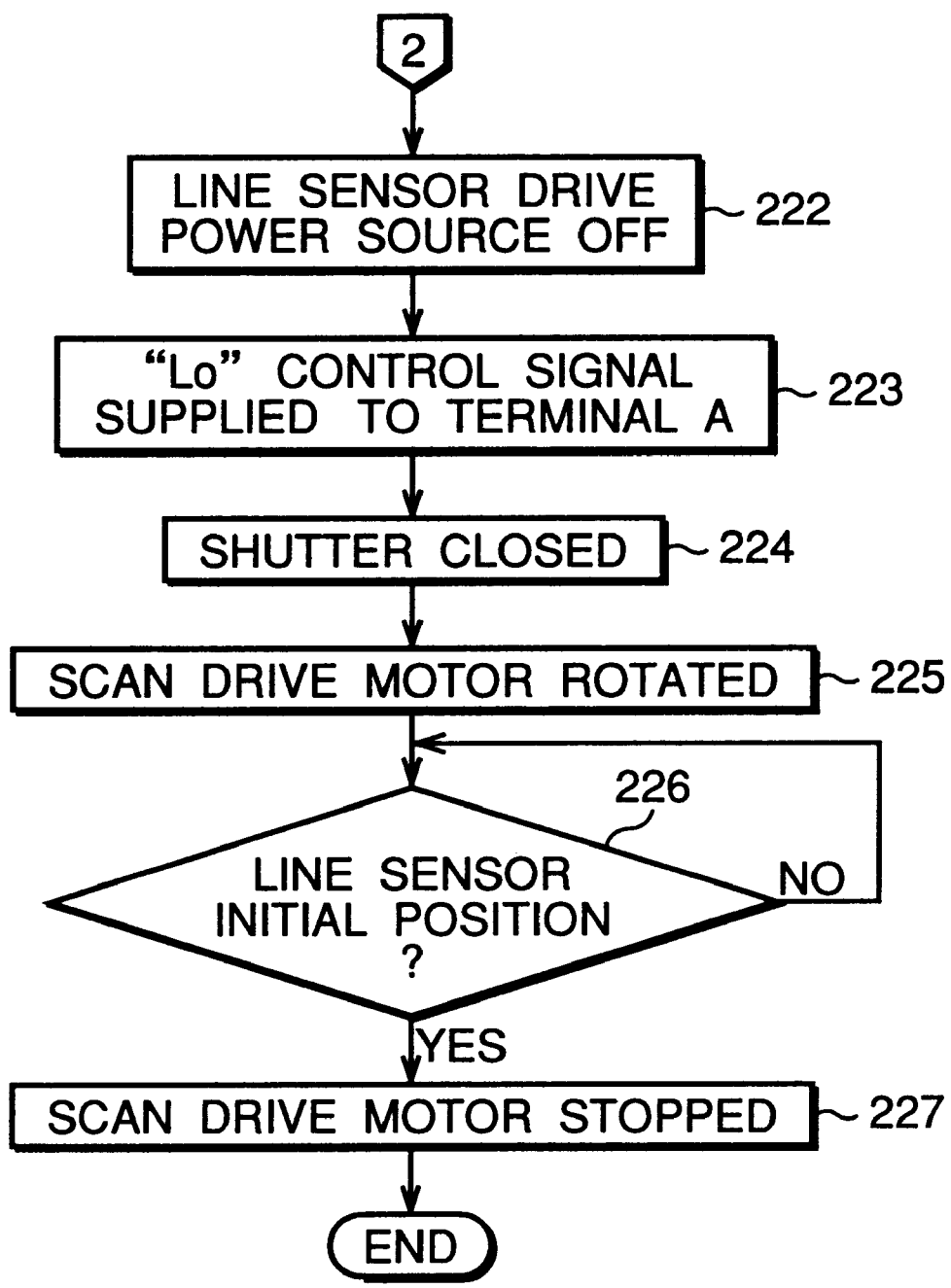

FIG. 12 is a timing chart showing a recording operation (i.e., a photographing operation) in which an image is recorded in the electro-developing recording medium 30, and a reading operation in which the image is read therefrom. FIGS. 13A and 13B are flow charts of a program for performing the recording operation. FIGS. 14A, 14B, and 14C are flow charts of a program for performing the reading operation. With reference to these drawings, the recording and reading operations will be described.

The recording operation is interruptedly executed by depressing the release switch 14 (reference S11), and while the recording operation is executed, an interruption execution such as the reading operation is prohibited. Note that, when the execution of the recording operation is started, the scanning mechanism 50 is positioned to face the second recording area 30b of the electro-developing recording medium 30.

In Step 102 of the recording operation, an output signal from the photometry sensor 28, i.e., a photometry value is sensed. In Step 103, an exposure calculation is initiated based on the photometry value (reference S12). When the completion of the exposure calculation is confirmed in Step 104 (reference S13), the recording operation is performed in Step 105 and the remaining Steps in accordance with the calculation result.

In Step 105, the degree of opening of the aperture 12a is adjusted from the fully open state to a predetermined degree of opening (reference S14), and the quick return mirror 21 is changed from the down position to the up position (reference S15). Upon confirmation in Step 106 that the quick return mirror 21 has been changed to the up position and the adjustment of degree of opening of the aperture 12a has been completed, the shutter 22 is opened in Step 107 (reference S16), and the first switch SW1 is turned ON (reference S17). In Step 109, a recording medium activating signal is outputted (reference S18), so that an electric voltage is applied to the electro-developing recording medium 30.

When the exposure time obtained based on the exposure calculation has elapsed and it is confirmed in Step 110 that the exposure has been completed, the shutter 22 is closed in Step 111 (reference S19). With the completion of the closing operation of the shutter 22, Step 112 is executed so that a rotation of the mirror 21 to the down position is started (reference S20) and a return to a fully open state of the aperture 12a is started (reference S21). In Step 113, the output of the recording medium activating signal is stopped (reference S22), and in Step 114, the first switch SW1 is turned OFF (reference S23).

Thus, the recording medium activating signal is continuously output at least while the shutter 22 is open, and during this period, a fixed predetermined voltage is applied to the first recording area 30a of the electro-developing recording medium 30. By exposing the electro-developing recording medium 30 under this condition, the object image is developed on the first recording area 30a as a visible image, which is held in the first recording area 30a even after the output of the recording medium activating signal is stopped.

When it is confirmed in Step 115 that the mirror 21 and the aperture 12a have returned to the initial conditions thereof, respectively, the operations of the mirror 21 and the aperture 12a are stopped in Step 116.

In Step 117, an illumination pattern is set in accordance with the information which is to be recorded in the second recording area 30b of the electro-developing recording medium 30, the information being exposure information (an aperture value and a shutter speed), a date, and so on. Thus, it is determined which laser diodes among the laser diodes 42b provided in the light source drive circuit 45 should be lit at this stage. In Step 118, a "Hi" control signal is supplied to some predetermined terminals included in the second terminals B1 through B4, in accordance with the information received (reference S24), so that a predetermined portion of the second recording area 30b is heated. When it is determined in Step 119 that a predetermined heating time has elapsed so that the information recording has been completed, Step 120 is executed so that a "Lo" control signal is supplied to all of the terminals B1 through B4 (reference S25), and thus, the laser diodes 42b are turned OFF. Thus, this recording operation ends.

Then, when the scan start switch 16 is depressed, the scanning command signal is output (reference S31), so that a scanning operation of the scanning mechanism 50 is started, and thus, the program of the reading operation is executed. Note that, when the execution of the reading operation is started, the scanning mechanism 50 is set to a position to face the second recording area 30*b* of the electro-developing recording medium 30.

In Step 202, the shutter 22 is opened (reference S32). In Step 203, a "Hi" control signal is supplied to the terminal A of the light source drive circuit 45 (reference S33), and thus, an illumination light is radiated from each of the laser diodes 42*b*. Note that a "Lo" control signal is supplied to each of the terminals B1 through B4.

In Step 204, the line sensor drive circuit 47 is operated, so that the power source of the line sensor 44 is turned ON (reference S34). In Step 205, an exposure to the line sensor 44 is started, so that electric charge accumulation of the line sensor 44 is carried out. Thus, pixel signals corresponding to the information (an aperture value, a shutter speed, and so on) recorded in the second recording area 30*b* are generated in the line sensor 44 (reference S35). When a predetermined constant period of time has elapsed since the start of the exposure, and thus it is determined in Step 206 that the exposure to the line sensor 44 has been completed, the pixel signals are read from the line sensor 44 in Step 207 (reference S36).

The pixel signals, which have been read from the line sensor 44 at this time, are binarized by the image process circuit 63, and thus the pixel signals are converted into "n" bits of digital data. The digital pixel signals are then decoded into indicating data by the system control circuit 20, so that the photographing data, such as the aperture value, the shutter speed, and so on, are indicated by the display device 68.

In Step 208, a scanner drive signal is output (reference S37), so that the scan drive motor 55 is rotated in a forward direction, and thus the moving member 52 of the scanning mechanism 50 starts to move upward from the lowest position of the electro-developing recording medium 30 (reference S38).

When it is confirmed in Step 209 that the line sensor 44 has been set at a reading start position (i.e., the first horizontal scanning line of the image to be scanned) of the first recording area 30*a*, the output of the scanner drive signal is stopped in Step 210 (reference S39), and thus the scan drive motor 55 is stopped (reference S40). This stopping operation is controlled by counting pulse signals, for example, used for rotating the scan drive motor 55.

Then, in Step 211, an exposure of the line sensor 44 is started, so that an accumulation of an electric charge by the line sensor 44 is performed (reference S41). When it is confirmed in Step 212, by sensing that a constant time has passed, for example, that the exposure of the line sensor 44 has been completed, in Step 213, a reading operation of the line sensor 44 is started, and pixel signals of one horizontal scanning line are output from the line sensor 44 (reference S42). In Step 214, the scanner drive signal for rotating the scan drive motor 55 in a forward direction is output (reference S43), so that the moving member 52 moves upward (reference S44).

During this movement of the moving member 52, when it is confirmed in Step 215 that a reading scan of the line sensor 44 has been completed, the reading scan is stopped in Step 216 (reference S45). Note that the completion of the reading scan is controlled by counting pulse signals, for example, which are output from the line sensor drive circuit 47 to drive the line sensor 44. When the completion of the reading scan is not confirmed in Step 215, Step 216 is skipped and Step 217 is executed, so that it is determined whether or not the line sensor 44 has been set at the position of the next horizontal scanning line, i.e., the next reading position. When the line sensor 44 has not been set at the position of the next horizontal scanning line, Steps 215 through 217 are executed again.

When it is confirmed in Step 217 that the line sensor 44 has been set at the position of the next horizontal scanning line, the output of the scanner drive signal is stopped in Step 218 (reference S46), and thus the scan drive motor 55 is stopped (reference S47). Then, in Step 219, the completion of the reading scan of the line sensor 44 is confirmed, in the same way as for Step 215, and the reading scan is stopped in Step 220. Namely, even when the loop of Steps 215 through 217 ends without executing Step 216, the reading scan of the line sensor 44 is completed in Step 220.

In Step 221, it is determined whether a reading scan for all of the horizontal scanning lines has been completed. The number of all of the horizontal scanning lines may be 2000, for example, and in Step 221, it is determined whether or not the counter value, which counts every completed reading operation of one horizontal scanning line, has reached 2000. When the reading operation of all of the horizontal scanning lines has not been completed, the process returns to Step 211, and the operations described above in Steps 211 through 221 are repeated.

Thus, when all of the horizontal scanning lines have been read (reference S50), the process goes from Step 221 to Step 222. In Step 222, the drive power source of the line sensor 44 is turned OFF (reference S51), and in Step 223, a "Lo" control signal is supplied to the terminal A of the light source drive circuit 45 (reference S52), so that the illumination light radiated by the laser diodes 42*b* is turned OFF. Note that the "Lo" control signals are continuously supplied to the second terminals B1 through B4.

In Step 224, the shutter 22 is closed (reference S53), and in Step 225, a scanner drive signal for operating the scan drive motor 55 in the rearward direction is output (reference S54), and thus the moving member 52 starts to descend (reference S55).

During the descent of the moving member 52, when it is confirmed in Step 226 that the scanning mechanism 50 has returned to the initial position, the output of the scanner drive signal is stopped in Step 227 (reference S56), so that the scan drive motor 55 is stopped (reference S57). Note that the sensing operation of the initial position executed in Step 226 is performed based on a signal output when part of the moving member 52 traverses a photo-interrupter (not shown).

Figure 15:
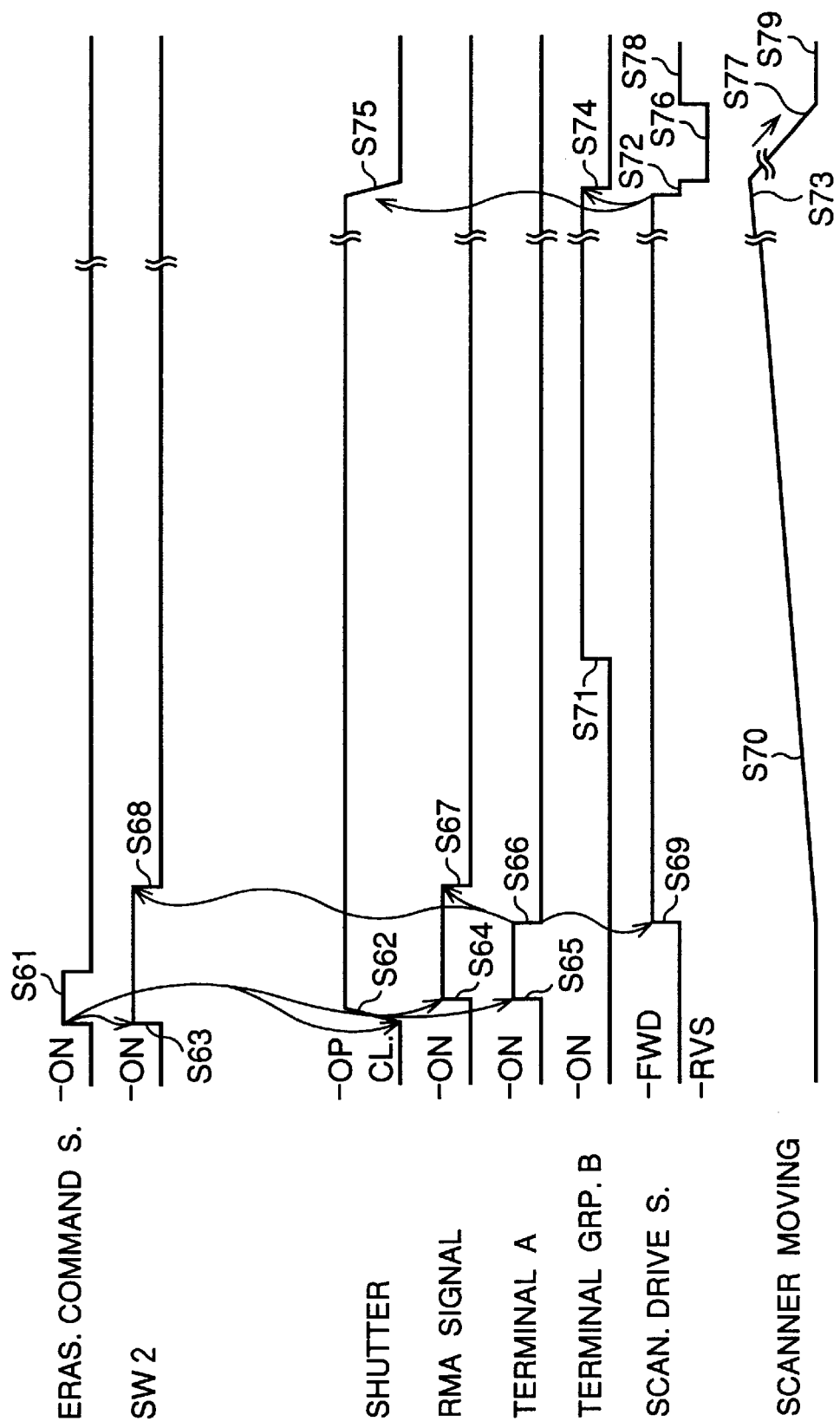
FIG. 15 is a timing chart showing an erasing operation.
Figure 16A:
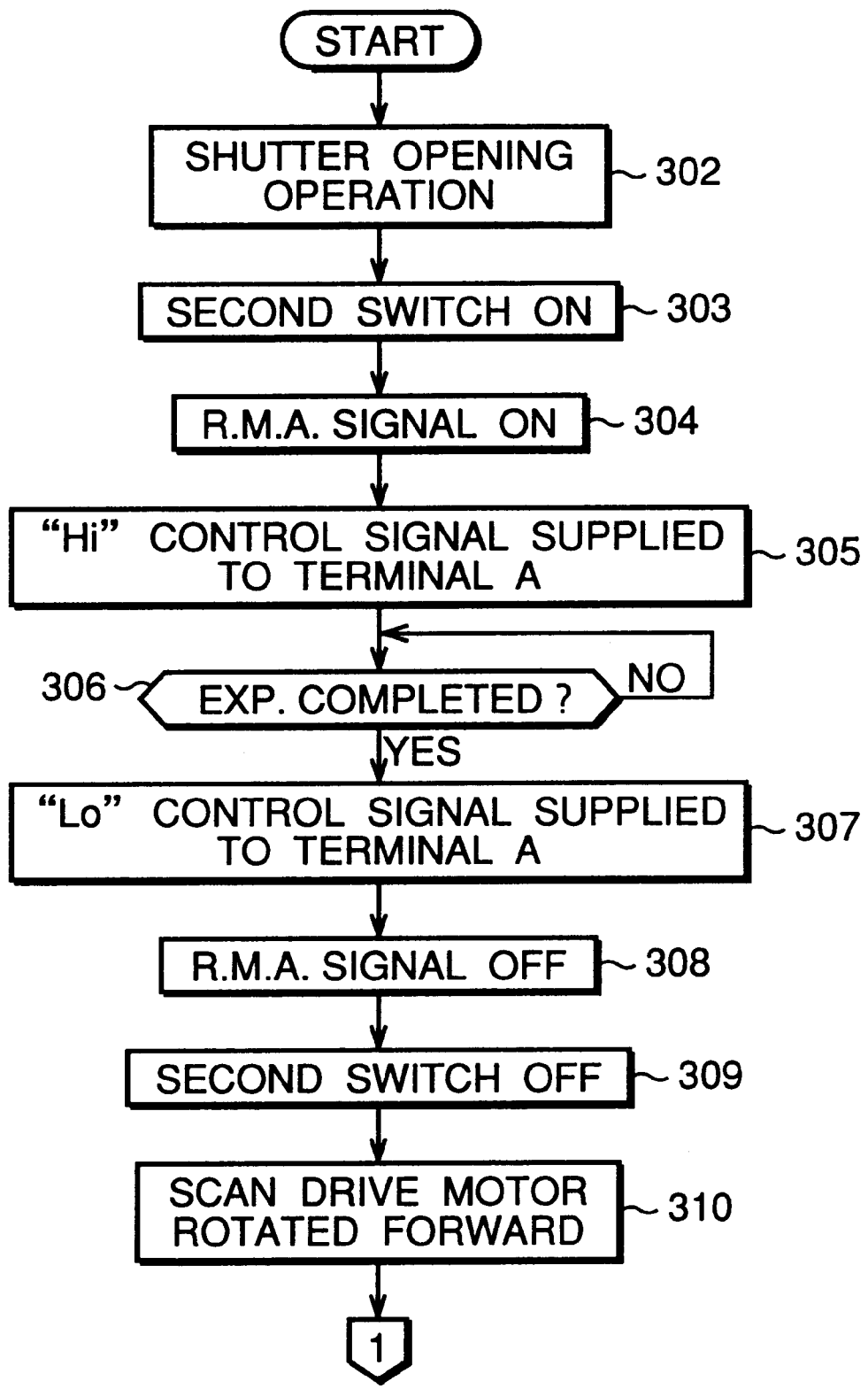
FIGS. 16A and 16B are flow charts of a program for performing the erasing operation.
Figure 16B:
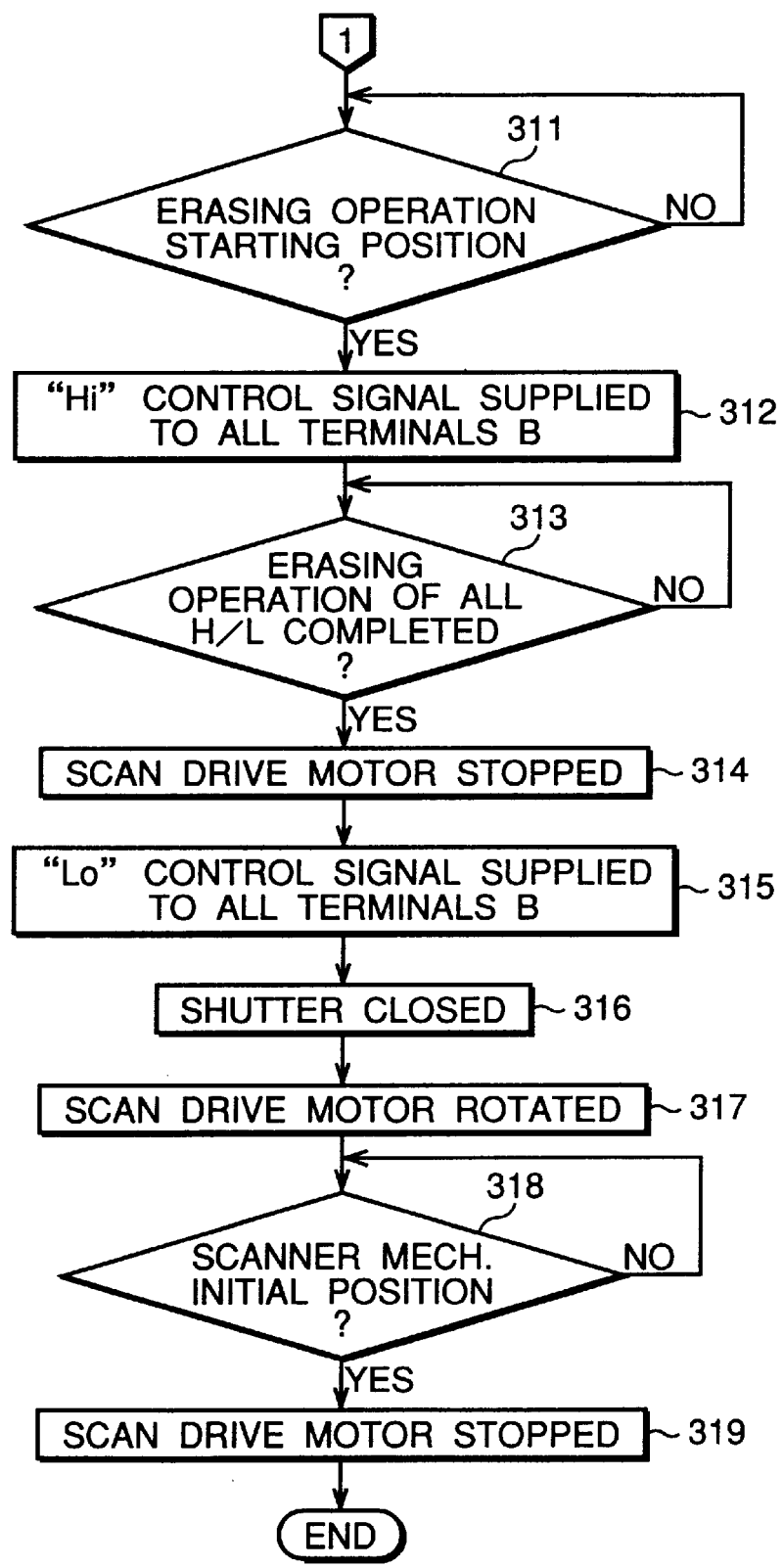

FIG. 15 is a timing chart showing an erasing operation in which an image and the information other than the image, which have been recorded in the electro-developing recording medium 30, are erased therefrom. FIGS. 16A and 16B are flow charts of a program for performing the erasing operation. With reference to these drawings, the erasing operation will be described. Note that, when the execution of the erasing operation is started, the scanning mechanism 50 is set to a position to face the second recording area 30*b* of the electro-developing recording medium 30.

When the erase switch 18 is pressed, an erasing command signal is output (reference S61), so that the program of the erasing operation is executed. In the erasing operation, the moving member 52 of the scanning mechanism 50 is not intermittently moved as in the reading operation shown in FIGS. 12 (see references S38, S40, S44, and S47), but is moved in a single, continuous, smooth motion.

In Step 302, the shutter 22 is opened (reference S62). In Step 303, the second switch SW2 is turned ON (reference S63). In Step 304, the recording medium activating signal is output (reference S64), so that an electric voltage is applied to the electro-developing recording medium. In Step 305, a "Hi" control signal is supplied to the terminal A of the light source drive circuit 45 (reference S65), so that illumination light is radiated by all of the laser diodes 42b. Note that the "Lo" control signals are supplied to all of the second terminals B1 through B4.

It is determined in Step 306 whether or not a predetermined time has passed since the execution of Step 305. When this predetermined time has passed, it is deemed that the exposure of the second recording area 30b has been completed, and thus the molecules of the liquid crystal 40 (see FIG. 3) have changed to a regular, parallel, arrangement condition (i.e., the liquid crystal 40 is now in a transparent condition). Then, at step 307 a "Lo" control signal is supplied to the terminal A of the light source drive circuit 45 (reference S66), and thus the laser diodes 42b are turned OFF. Note that the "Lo" signals are continuously supplied to all of the second terminals B1 through B4.

Then, the output of the recording medium activating signal is stopped in Step 308 (reference S67), and the second switch SW2 is turned OFF in Step 309 (reference S68).

In Step 310, a scanner drive signal is output (reference S69), so that the scan drive motor 55 rotates in a forward direction, and thus the moving member 52 of the scanning mechanism 50 starts to ascend from the lowest position (reference S70). When it is confirmed in Step 311 that the laser diodes 42b are set to a position where the erasing operation is to be started, i.e., the position corresponding to the lowest horizontal scanning line of the first recording area 30a, Step 312 is executed, so that the "Hi" control signal is supplied to each of the terminals B1 through B4 (reference S71). As a result, a part of the first recording area 30a, to which the laser diodes 42b face, is heated, so that the image recorded therein is erased.

The scanning mechanism 50 is continuously moved upward, and during this ascending movement of the scanning mechanism 50, the laser diodes 42b continuously output the heat light. Therefore, the image recorded in the first recording area 30a is erased from the lower portion to the upper portion. When it is confirmed in Step 313 that the scanning mechanism 50 has reached the position corresponding to the uppermost horizontal scanning line of the first recording area 30a, and thus all of the horizontal scanning lines have been erased, the scanner drive signal is stopped in Step 314 (reference S72), so that the scan drive motor 55 is stopped (reference S73). In Step 315, the "Lo" signals are supplied to all of the second terminals B1 through B4 (reference S74), and the output of the heat light from all of the laser diodes 42b is thereby stopped.

In Step 316, the shutter 22 is closed (reference S75), and in Step 317, a scanner drive signal for operating the scan drive motor 55 in the rearward direction is output (reference S76), and thus the moving member 52 starts to descend (reference S77). During the descending movement of the moving member 52, when it is confirmed in Step 318 that the moving member 52 has returned to the initial position of the scanning mechanism 50, the scanner drive signal is stopped in Step 319 (reference S78), so that the scan drive motor 55 is stopped (reference S79).

As described above, according to the embodiment, an image is recorded in the first recording area 30a, and information indicating the photographing condition, such as an aperture value, a shutter speed, and so on, or information indicating a date, can be recorded in the second recording area 30b close to the first recording area 30a. The recording operation and the erasing operation of the image and information are performed by controlling the intensity of the output laser from the light source 42. Therefore, any exclusive erasing device is not required in the electro-developing type camera, and therefore, the construction in the electro-developing type camera can be simplified, and the camera can be compact.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 8-153170 (filed on May 24, 1996) and 8-303834 (filed on Oct. 30, 1996) which are expressly incorporated herein, by reference, in their entirety.

We claim:

1. An image recording device comprising:
   an electro-developing recording medium by which an image formed thereon is electronically developed;
   a light source illuminating said electro-developing recording medium so that said image is read therefrom; and
   a controller controlling the intensity of light output by said light source so that the intensity has a value greater than a predetermined value to heat said electro-developing recording medium, whereby information other than said image is recorded thereon.

2. A device according to claim 1, wherein said light source comprises a semiconductor laser light source.

3. A device according to claim 1, wherein said light source comprises a plurality of semiconductor laser diodes, "n" bits of digital information being recorded on said electro-developing recording medium by turning ON and OFF said semiconductor laser diodes, said "n" being the number of said semiconductor laser diodes.

4. A device according to claim 1, wherein said electro-developing recording medium has a first recording area in which said image is recorded and a second recording area in which said information is recorded.

5. A device according to claim 4, wherein said electro-developing recording medium has first and second electrodes, so that an electric voltage is independently applied to each of said first and second recording areas.

6. A device according to claim 5, wherein said second recording area is heated while said electric voltage is not applied to said second recording area, so that said information is recorded in said second recording area.

7. A device according to claim 5, wherein said controller controls the intensity of said light so that the intensity has a value less than said predetermined value to illuminate said electro-developing recording medium, and said first recording area is illuminated while said electric voltage is applied to said first recording area, so that said image is read from said first recording area.

8. A device according to claim 5, wherein said first recording area is heated while said electric voltage is not applied to said first recording area, so that said image recorded in said first recording area is erased.

9. A device according to claim 5, wherein said controller controls the intensity of said light so that the intensity has a value less than said predetermined value to illuminate said electro-developing recording medium, and said second recording area is illuminated while said electric voltage is applied to said second recording area, so that said information recorded in said second recording area is erased.

10. A device according to claim 1, further comprising a reader reading said information recorded on said electro-developing recording medium.

11. A device according to claim 1, wherein said electro-developing recording medium comprises an electrostatic information recording medium generating an electric charge in accordance with an image formed thereon, and an electric charge storage medium which generates a visible image in accordance with said electric charge and which can hold said visible image.

12. A device according to claim 11, wherein said electric charge storage medium is a liquid crystal display having a memory-type liquid crystal.

13. An image recording device provided in a camera, comprising:

an electro-developing recording medium by which an image formed thereon is electronically developed, said electro-developing recording medium having a first recording area in which an image is recorded, and a second recording area in which information other than said image is recorded; and a semiconductor laser light source operating in one of an LED oscillating condition and a laser oscillating condition, said semiconductor laser light source outputting an illuminating light when operating in said LED oscillating condition and outputting a heat light when operating in said laser oscillating condition;

said image recorded in said first recording area being read therefrom while said first recording area is illuminated by said illuminating light, and said information being recorded in said second recording area while said second recording area is heated by said heat light.

* * * * *